United States Patent
Karl et al.

(10) Patent No.: US 10,293,708 B2
(45) Date of Patent: May 21, 2019

(54) RECUPERATIVE BRAKE ON A VEHICLE

(71) Applicant: AUDI AG, Ingolstadt (DE)

(72) Inventors: Bernhard Karl, Gaimersheim (DE); Uwe Feldmann, Nassenfels (DE); Felix Winkelmeyr, Ingolstadt (DE); René Daschner, Ingolstadt (DE); Thomas Heckel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 73 days.

(21) Appl. No.: 15/491,567

(22) Filed: Apr. 19, 2017

(65) Prior Publication Data

US 2017/0305299 A1    Oct. 26, 2017

(30) Foreign Application Priority Data

Apr. 20, 2016 (DE) .................. 10 2016 004 755

(51) Int. Cl.
| | |
|---|---|
| *B60L 15/20* | (2006.01) |
| *B60L 7/18* | (2006.01) |
| *B60L 11/18* | (2006.01) |
| *B60T 8/17* | (2006.01) |

(Continued)

(52) U.S. Cl.
CPC ............ *B60L 15/2045* (2013.01); *B60L 7/18* (2013.01); *B60L 11/005* (2013.01); *B60L 11/1803* (2013.01); *B60L 11/1861* (2013.01); *B60L 11/1862* (2013.01); *B60L 15/2009* (2013.01); *B60L 15/2018* (2013.01); *B60T 8/17* (2013.01); *B60W 30/00* (2013.01); *B60L 2220/42* (2013.01); *B60L 2220/54* (2013.01); *B60L 2240/421* (2013.01); *B60L 2240/54* (2013.01); *B60L 2260/22* (2013.01); *B60T 2270/60* (2013.01); *Y02T 10/641* (2013.01); *Y02T 10/645* (2013.01); *Y02T 10/646* (2013.01); *Y02T 10/705* (2013.01); *Y02T 10/7005* (2013.01);

(Continued)

(58) Field of Classification Search
None
See application file for complete search history.

(56) References Cited

U.S. PATENT DOCUMENTS

| | | | |
|---|---|---|---|
| 5,343,970 A * | 9/1994 | Severinsky | ............ B60K 6/387 180/65.25 |
| 8,926,439 B2 | 1/2015 | Daschner | |
| 2007/0069673 A1 | 3/2007 | Oyobe et al. | |

(Continued)

FOREIGN PATENT DOCUMENTS

| | | | |
|---|---|---|---|
| DE | 10 2005 051 433 A1 | 5/2007 | |
| DE | 10 2009 019 527 A1 | 12/2009 | |

(Continued)

OTHER PUBLICATIONS

European Search Report dated Aug. 17, 2017 with respect to counterpart European patent application EP 17 16 3746.

(Continued)

*Primary Examiner* — Tamara L Weber
(74) *Attorney, Agent, or Firm* — Henry M. Feiereisen LLC

(57) ABSTRACT

The present invention relates to a method for recuperation based braking of a vehicle in which electrical energy generated during a braking process is decreased by operating at least one second electric machine of the vehicle in a zero slip mode in order to prevent overcharging of a traction battery of the vehicle.

7 Claims, 2 Drawing Sheets

(51) Int. Cl.
  *B60L 11/00*     (2006.01)
  *B60W 30/00*     (2006.01)
(52) U.S. Cl.
  CPC ........ *Y02T 10/7022* (2013.01); *Y02T 10/7044*
          (2013.01); *Y02T 10/72* (2013.01); *Y02T*
                              *10/7275* (2013.01)

(56) References Cited

U.S. PATENT DOCUMENTS

| | | | |
|---|---|---|---|
| 2009/0118916 A1* | 5/2009 | Kothari | B60W 20/10 |
| | | | 701/53 |
| 2012/0238371 A1 | 9/2012 | Daschner | |
| 2015/0081152 A1* | 3/2015 | Lu | B60L 11/1851 |
| | | | 701/22 |
| 2015/0200613 A1 | 7/2015 | Ota et al. | |
| 2015/0336458 A1 | 11/2015 | Lee et al. | |

FOREIGN PATENT DOCUMENTS

| | | |
|---|---|---|
| DE | 10 2013 215763 A1 | 3/2014 |
| DE | 10 2014 116 703 A1 | 11/2015 |
| GB | 2 483 375 A | 3/2012 |
| JP | 2006 321397 A | 11/2006 |

OTHER PUBLICATIONS

Translation of European Search Report dated Aug. 17, 2017 with respect to counterpart European patent application EP 17 16 3746.

* cited by examiner

RECUPERATIVE BRAKE ON A VEHICLE

CROSS-REFERENCES TO RELATED APPLICATIONS

This application claims the priority of German Patent Application, Serial No. 10 2016 004 755.0, filed Apr. 20, 2010, pursuant to 35 U.S.C. 119(a)-(d), the content of which is incorporated herein by reference in its entirety as if fully set forth herein.

BACKGROUND OF THE INVENTION

The invention relates to a recuperative brake on a vehicle.

The following discussion of related art is provided to assist the reader in understanding the advantages of the invention, and is not to be construed as an admission that this related art is prior art to this invention.

The energy generated during braking of a vehicle can be converted into electrical energy by an electric machine that operates in a recuperation mode so that on one hand electrical energy is provided, which can be used again at a later point in time for driving the vehicle, and on the other hand a negative torque can be generated by means of which the vehicle can be decelerated and can thereby relieving respective friction brakes.

When a recuperation power of a respective electric machine is reliably and constantly available a friction brake system of a vehicle can be constructed more lightweight compared to traditional constructions that have no recuperative support. As a consequence a corresponding vehicle can also be configured more lightweight and thus more dynamic or efficient.

When a supply battery or a traction battery of a vehicle is completely charged a recuperative braking is no longer available; there is therefore a need for ensuring a constantly available operation of a recuperation-supported brake.

It would therefore be desirable and advantageous to provide an improved method for recuperation-based braking of a vehicle.

SUMMARY OF THE INVENTION

According to one aspect of the present invention a method for recuperation-based braking of a vehicle, includes generating electrical energy with a first electric machine of the vehicle during a braking process; operating with the electrical energy generated by the first electric machine a second electric machine in a zero slip mode in which a rotary field of a stator of the second electric machine synchronously follows a movement of a rotor of the second electric machine, so that no-load losses of the second electric machine are used to decrease the electrical energy generated by the first electric machine to thereby prevent overcharging of a traction battery of the vehicle.

According to another aspect of the invention a method for recuperation-based braking of a vehicle includes generating electrical energy with a first electric machine of the vehicle during a braking process; as a function of an actual state of charge of a traction battery of the vehicle either operating with the electrical energy generated by the first electric machine a second electric machine in a zero slip mode in which a rotary field of a stator of the second electric machine synchronously follows a movement of a rotor of the second electric machine, so that no-load losses of the second electric machine are used to decrease the electrical energy generated by the first electric machine to thereby prevent overcharging of a traction battery of the vehicle, or transferring the electrical energy to the traction battery of the vehicle The disclosed method serves in particular for enabling a constant recuperation based operation of the vehicle brake. For this purpose, according to an advantageous feature of the invention, electrical energy generated during a recuperation-based operation of a vehicle brake, i.e., during braking with an electric machine, is fed into a traction battery or energy storage until the traction battery is charged up to a predetermined threshold value. When the traction battery is charged up to the predetermined threshold value the generated electrical energy is decreased by operating at least one second electric machine in a zero slip mode. Decreasing the electrical energy by operating the at least one second electrical machine in the zero slip mode allows preventing overcharging the traction battery in the event of continued recuperation and/or makes it possible to provide a temporary storage for taking up electrical energy that may be generated by future recuperation processes. The disclosed method thus enables a continuous recuperation-based braking operation.

By means of the method according to the invention it is possible to constantly, reliably and repeatedly provide a negative torque generated by a recuperation operation, i.e., a recuperation-dependent deceleration value, so that as a result of the constantly available recuperation-related negative torque a vehicle brake system can be adjusted to respective specifications which are changed compared to traditional specifications, i.e., the brake system can be constructed with smaller and lighter friction brakes.

The term zero slip in the context of the present invention means an operating mode of an electric machine in which the electric machine is used to use up electrical energy without the electric machine driving a respective vehicle, i.e., without the electric machine generating a positive torque or providing the positive torque to the wheels. A zero slip mode can for example be accomplished in that a rotary field of a stator of a respective electric machine synchronously follows a rotational speed of the rotor, i.e., a movement of a rotor of the electric machine, so that no-load losses of the electric machine are used in order to decrease electrical energy and thereby to discharge the battery in a targeted manner, with no torque being provided to the wheels.

According to another advantageous feature of the invention, the first electric machine provided according to the invention and the at least one second electric machine provided according to the invention can be identical, or different electric machines can be selected as the first and the at least one second electric machine.

According to another advantageous feature of the invention, a friction brake is supported by an electric machine that is switched to recuperation mode during a recuperation-supported braking so that the electric machine provides at least a portion of a braking force requested by a user by converting mechanical energy generated during a braking procedure into electrical energy.

According to another advantageous feature of the invention, electrical energy generated during the braking process is decreased in dependence on an actual state of charge of the traction battery of the vehicle by means of operating the at least one second electric machine in a zero slip mode, or the generated electrical energy is transferred to the traction battery of the vehicle and stored there.

In order not to unnecessarily waste a respective amount of electrical energy generated during a braking procedure by a permanent zero slip operation, i.e., operation of a respective electric machine in a zero slip mode, an embodiment of the present invention provides that the amount of electrical energy is only decreased by means of an electrical machine that is switched into the zero slip mode when a traction battery is charged above a predeterminable threshold value, for example 98%, and a further charging would lead to damage to the battery and as a result to an at least limited operation or complete failure of the braking capability of the electric machine. Correspondingly a state of charge of the traction battery or a corresponding energy storage is continuously monitored and is used as input value for a control unit which controls a decrease of electrical energy by means of an electric machine that can be switched into the zero slip mode.

According to another advantageous feature of the invention, the electrical energy generated during the braking process is first transferred to a buffer storage and is subsequently decreased by operating at least one second electric machine of the vehicle in a zero slip mode.

Using a buffer storage makes it possible to introduce a temporal element into controlling a discharging process of a battery. This means that by means of a buffer storage a great amount of electrical energy can be withdrawn from a traction battery or taken up by an electric machine used for recuperation and can at a later point in time or over a time period that is longer compared to a respective braking process be decreased by means of an electric machine that is switched to the zero slip mode.

According to another advantageous feature of the invention, the buffer storage is configured as a part of the traction battery of the vehicle, and the buffer storage is dynamically discharged by operating the at least one second electric machine of the vehicle in a zero slip mode when no wheel torque (positive or negative) is requested or while a friction brake is active without recuperative brake support. As a result the buffer storage can always be available for recuperative braking processes. This is in particular important for longer downhill drives.

In order to prepare a respective vehicle for a situation in which a particularly great amount of electrical energy is provided by recuperative processes, such as a downhill drive, it is possible to dynamically decrease the electrical energy of a traction battery or distribute electrical energy from the traction battery into a buffer storage for decrease by an electric machine that is switched into the zero slip mode in dependence of defined driving situations, for example operation of the vehicle with active friction brake and/or when no drive torque is requested.

According to another advantageous feature of the invention, a preventive discharge management can be performed by adjusting the threshold of a state of charge of the traction battery for activating the method according to the invention, for example in dependence on the number and strength of respective braking maneuvers, wherein electrical energy is also decreased in periods in which no energy is provided by a recuperation process in order to provide a buffer for taking up electrical energy at a later time if required.

According to another advantageous feature of the invention, the at least one second electric machine, which is switched into the zero slip mode for decreasing of the electrical energy, corresponds to the first electric machine by means of which the electrical energy was generated during the braking process.

In particular in vehicles with one-axle drive oftentimes only one electric machine is available so that this electric machine has to be used for generating electrical energy by a recuperation process as well as for decreasing electrical energy generated during the recuperation process. For this purpose it is provided that by means of the electric machine operated in the zero slip mode a traction battery of a respective vehicle is always discharged below a predetermined threshold value so that a buffer storage is generated which can be used for taking up energy generated in a later recuperation process. Of course the buffer storage can also be provided outside the traction battery for example in the form of a capacitor. In a further possible embodiment of the disclosed method it is provided that when the vehicle has at least two electrically driven axles electrical energy generated during the braking process by an electric machine assigned to the first axle is decreased by operating an electric machine which is assigned to the corresponding second axle in a zero slip mode.

When multiple electric machines are available as is the often the case in vehicles with mufti-axle drive, respective electric machines can be operated alternatingly wherein a first electric machine generates electrical energy in a recuperation operation and a further electric machine decreases the electrical energy generated by the first electric machine without driving the vehicle and as a result enables via the recuperation operation of the first electric machine the generation of braking energy for decelerating the vehicle.

According to another advantageous feature of the invention, when multiple electric machines are used, all electric machines can briefly be switched into a recuperation operation in order to achieve a particularly high deceleration power, such as required for an emergency braking. For this purpose for example a threshold value of a pedal position can be predetermined, upon exceedance of which an emergency braking is performed and all electric machines are switched into the recuperation mode.

According to another advantageous feature of the invention, the electrical energy generated by means of the electric machine assigned to the first axle is directly decreased by the electric machine assigned to the second axle.

According to another advantageous feature of the invention, the first electric machine and the at least one second electric machine are precisely adjusted to each other regarding their power outputs or power requirements so that a buffer storage is not required and a respective amount of electrical energy generated by the first electric machine operated in the recuperation mode is decreased directly, i.e., without an intermediate storage, by operating the at least one second electric machine in a zero slip mode.

According to another advantageous feature of the invention, exactly that amount of electrical energy is generated by means of the electric machine assigned to the first axle that can subsequently be decreased by the electric machine assigned to the second axle.

By adjusting a recuperation power to a zero slip-dependent decrease power of electrical energy a permanent "electrically neutral" operation can be accomplished in which no electrical energy is accumulated.

According to another advantageous feature of the invention, in a completely charged vehicle, which is to be decelerated during a downhill drive by means of a recuperative operation of an electric machine of the vehicle, it is first tested whether the driver desires the electric machine to generate a torque or to output power. When the driver brakes for example by means of a friction brake or intends to operate the vehicle in a coasting mode or free mode, i.e., without torque to be generated, the electric machine can be switched into the zero slip mode and thereby the battery of the vehicle can be discharged so that electrical energy generated by the recuperation operation can be transferred to the battery again.

According to another aspect of the present invention a vehicle includes a first electric machine configured to generate electrical energy during a recuperation-supported braking process of the vehicle; a second electric machine; and a control device, wherein the control device is configured, as a function of a state of charge of a traction battery of the vehicle, to operate with the electrical energy generated by the first electric machine a second electric machine in a zero slip mode in which a rotary field of a stator of the second electric machine synchronously follows a movement of a rotor of the second electric machine, so that no-load losses of the second electric machine are used to decrease the electrical energy generated by the first electric machine to thereby prevent overcharging of a traction battery of the vehicle.

The disclosed method serves in particular for operating the disclosed vehicle.

According to another advantageous feature of the invention, the control device is further configured to decrease the electrical energy in dependence on a state of charge of a traction battery of the vehicle by switching the at least one second electric machine into a zero slip mode.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
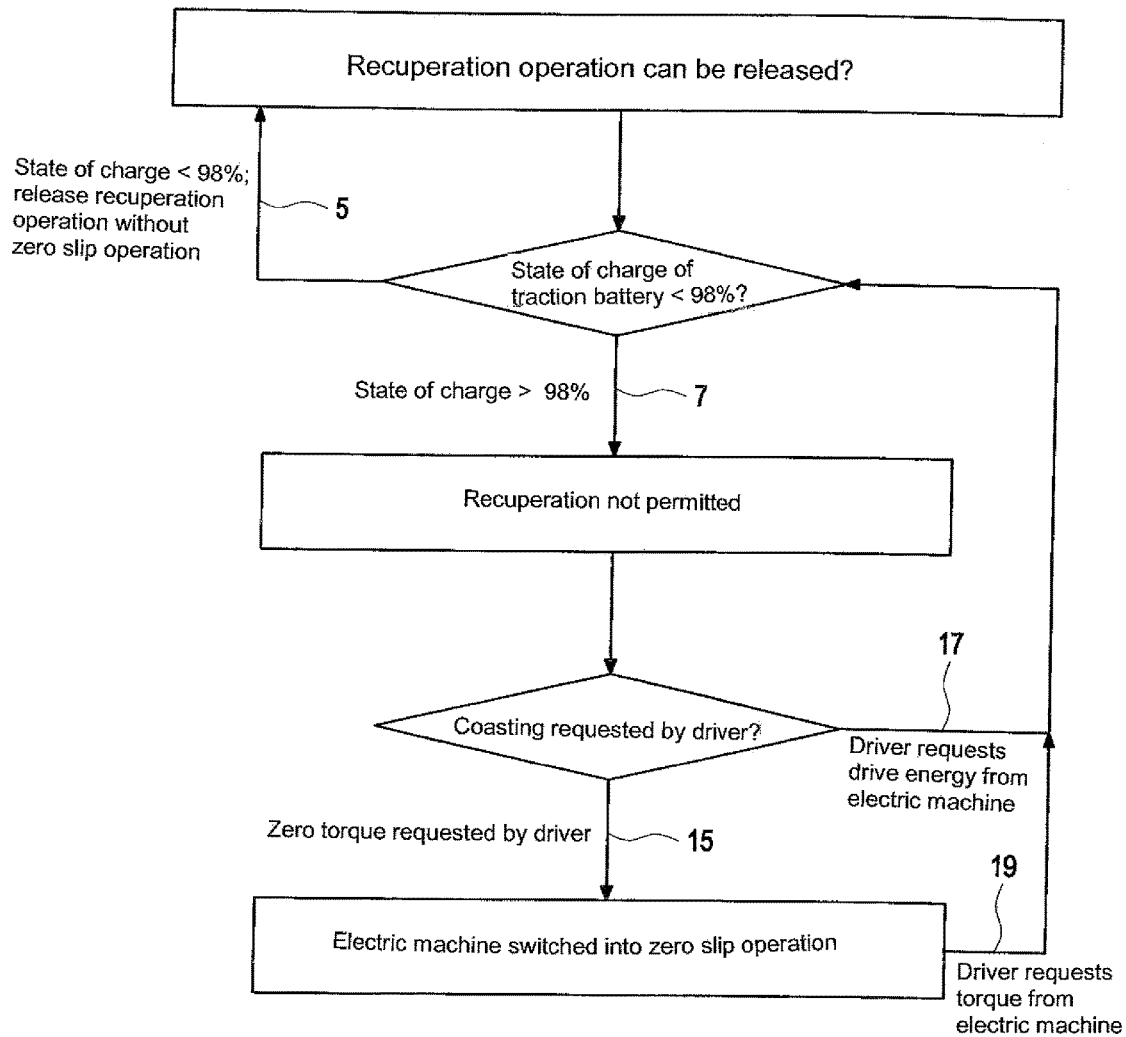
FIG. 1 shows a schematic representation of a possible embodiment of the disclosed method.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a flow chart for controlling a recuperation operation of an electric machine of a vehicle.

For a recuperation-based braking, i.e., a braking in which an electric machine which is operated in a recuperation operation, i.e., an operation in which mechanical energy generated during braking is converted into electrical energy, it is tested first in a step 1 whether the recuperation operation can be released for recuperation-based braking and if a zero slip operation is required, i.e., an operation of the electric machine in a zero slip mode in which no drive torque is generated by the electric machine however electrical energy is decreased. For this it is tested in a step 3 whether a state of charge of a battery such as a traction battery of a vehicle is below a threshold value of for example 98% so that electrical energy generated by the recuperation operation can be transferred to the traction battery. Should the state of charge of the traction battery be below the threshold value of 98% the recuperation operation is released without a zero slip operation of the electric machine as indicated by arrow 5 and correspondingly generated electrical energy is transferred to the traction battery.

If the state of charge of the traction battery is above the threshold value of 98% as indicated by the arrow 7 the recuperation operation is not permitted according to rule 9. In order to nevertheless release the recuperation operation it first has to be verified in a step 11 whether a respective driver has requested a zero torque, i.e., a coasting.

If the driver has requested a zero torque as indicated by the arrow 15 and the electric machine is correspondingly available for a zero slip operation the electric machine is switched into the zero slip operation in a step 13 in order to decrease electrical energy from the traction battery and to provide a buffer storage for the electrical energy generated during the recuperation operation. If the driver does not request a zero torque or does not request drive energy from the electric machine it is tested again in a step 3, as indicated by the arrow 17, whether the state of charge of the traction battery is above 98%. As soon as the state of charge of the traction battery falls below 98% the recuperation operation is released without a zero slip operation of the electric machine as indicated by arrow 5. So long as the state of charge of the traction battery is above 98% it is either switched into the zero slip mode or in response to a request by the driver the electric machine is used for generating a torque whereby the traction battery is also partially discharged.

The zero slip operation can be performed for a predetermined period of time or up to a predetermined threshold value of the state of charge of the traction battery. in any case the zero slip operation ends when the driver requests a torque form the electric machine whereupon the sequence starts again with the testing of the state of charge of the traction battery according to step 3 as indicated by arrow 19. In order to reliably prevent a braking at a state of charge of the traction battery above 98% and to prevent an overcharging of the traction battery as a result of a recuperation operation it can be provided that only a friction brake is used for braking. Hereby however, depending on the strength of a respective braking force requested by a user, an emergency operation can be activated in which independent from the state of charge of the traction battery a recuperation based braking is nevertheless performed.

Figure 2:
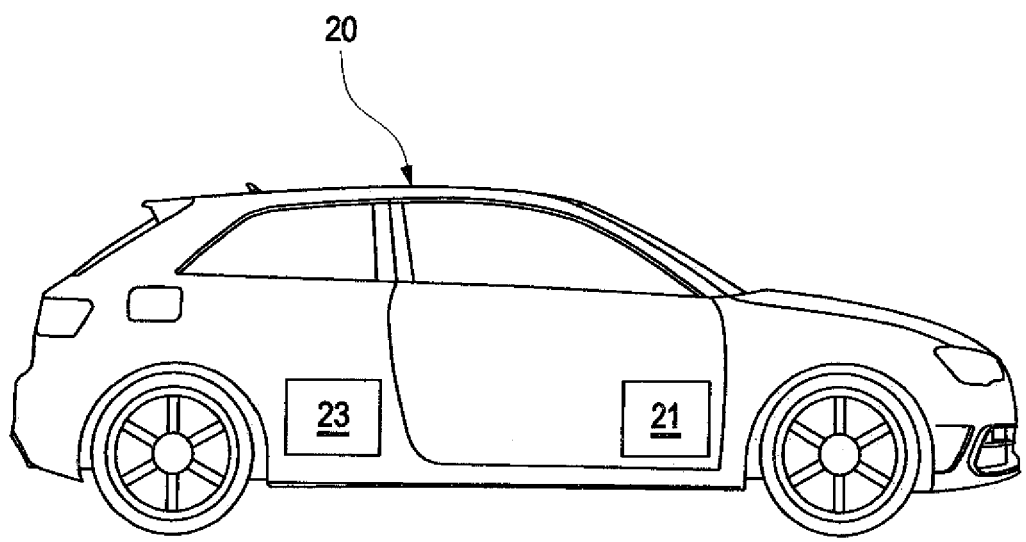
FIG. 2 shows a schematic representation of a vehicle with a control device configured for implementing the disclosed method.

FIG. 2 shows a vehicle 20 with a first electric machine 21 and a traction battery 23. In order to be able to decelerate the vehicle 20 at all times with a recuperation-based braking it is required that the traction battery is not charged above a state of charge of 98%.

In order to prevent the traction battery 23 from being charged beyond the state of charge of 98%, for example during a downhill drive in which electrical energy is constantly supplied to the traction battery 23 due to numerous braking maneuvers, it is provided that the electric machine 21 is always switched into a zero slip mode when the electric machine 21 is not used for generating a drive torque or for a recuperation operation and when for example a friction brake is active without recuperative brake support, in which zero slip mode the electric machine 21 consumes electrical energy but does not generate a torque so that electrical energy is withdrawn from the traction battery 23 and capacity for electrical energy generated in a future braking maneuver is present in a buffer storage provided by the traction battery 23.

What is claimed is:

1. A method for recuperation-based braking of a vehicle, comprising:
generating electrical energy with a first electric machine of the vehicle during a braking process;
operating with the electrical energy generated by the first electric machine a second electric machine in a zero slip mode in which a rotary field of a stator of the second electric machine synchronously follows a movement of a rotor of the second electric machine, so that no-load losses of the second electric machine are used to decrease the electrical energy generated by the first electric machine to thereby prevent overcharging of a traction battery of the vehicle; and
performing the zero slip mode operation for a predetermined period of time or up to a predetermined threshold value of a state of charge of the traction battery of the vehicle until a driver requests a torque from the first electric machine or the second electric machine.

2. The method of claim 1, further comprising prior to the decreasing step transferring the electrical energy to a buffer storage.

3. The method of claim 2, wherein the buffer storage is configured as a part of the traction battery of the vehicle, said method further comprising dynamically discharging the buffer storage by operating the second electric machine of the vehicle in the zero slip mode when the vehicle is operated in a free mode.

4. The method of claim 2, wherein the second electric machine is identical to the first electric machine.

5. The method of claim 1, wherein the first electric machine is assigned to a first one of at least two electrically driven axles of the vehicle, and the second electric machine is assigned to a second one of the at least two electrically driven axles of the vehicle.

6. The method of claim 5, wherein the electrical energy generated by the first electric machine is directly decreased by the second electric machine.

7. The method of claim 5, wherein an amount of the electrical energy generated by the first electric machine corresponds exactly to an amount of electrical energy that can subsequently be decreased by the second electric machine.

* * * * *